US005326030A

United States Patent [19]
Benest

[11] Patent Number: 5,326,030
[45] Date of Patent: Jul. 5, 1994

[54] METHOD AND APPARATUS FOR CROP SPRAYING

[75] Inventor: Roger S. Benest, St. Lawrence, Channel Islands

[73] Assignee: Benest Engineering Limited, Channel Islands

[21] Appl. No.: 962,802

[22] PCT Filed: Jul. 4, 1990

[86] PCT No.: PCT/GB90/01033

§ 371 Date: Feb. 24, 1993

§ 102(e) Date: Feb. 24, 1993

[87] PCT Pub. No.: WO92/00670

PCT Pub. Date: Jan. 23, 1992

[51] Int. Cl.$^5$ ............................................. B05B 1/20
[52] U.S. Cl. ............................ 239/1; 239/162; 239/164; 239/167; 239/168
[58] Field of Search .................. 239/1, 155, 159, 162, 239/164, 166, 167, 168

[56] References Cited

U.S. PATENT DOCUMENTS

| 1,348,038 | 7/1920 | Neumeyer . | |
|---|---|---|---|
| 1,526,642 | 2/1925 | Nissley | 239/164 |
| 1,906,013 | 4/1933 | Phalen | 239/164 |
| 2,301,213 | 11/1942 | Kang | 239/162 X |
| 3,143,295 | 8/1964 | Booker | 239/164 X |
| 3,565,340 | 2/1971 | Meinert et al. | 239/168 |
| 3,785,564 | 1/1974 | Baldocchi . | |
| 4,588,128 | 5/1986 | Broyhill et al. | 239/168 |

FOREIGN PATENT DOCUMENTS

| 1185216 | 4/1985 | Canada . | |
|---|---|---|---|
| 0176084 | 4/1986 | European Pat. Off. . | |
| 1181485 | 11/1964 | Fed. Rep. of Germany . | |
| 3512992 | 10/1986 | Fed. Rep. of Germany | 239/159 |
| 2409003 | 6/1979 | France | 239/168 |
| 2560533 | 9/1985 | France | 239/168 |
| 2563970 | 11/1985 | France . | |
| 224380 | 4/1943 | Switzerland | 239/164 |
| 229146 | 1/1944 | Switzerland . | |
| 635424 | 4/1950 | United Kingdom . | |
| 1574308 | 9/1980 | United Kingdom . | |
| 8701909 | 4/1987 | World Int. Prop. O. . | |

Primary Examiner—Andres Kashnikow
Assistant Examiner—William Grant
Attorney, Agent, or Firm—Brooks & Kushman

[57] ABSTRACT

A method and apparatus for spraying in relation to row crops provides downwardly extending support elements or drop legs carrying spray nozzles in the region of their lower ends. The support elements extend downwardly between crop rows and are moved lengthwise of the crop rows while spraying proceeds. The spray nozzles deliver spray generally upwardly and/or horizontally with respect to the ground so as to treat crop material in the rows. The support elements are mounted so as to float freely and permit lateral movement to follow lateral and other row and crop contours. The support elements may be mounted on a boom. The boom may also be provided with downwardly directed spraying nozzles for simultaneous or sequential use. The boom is adapted to fold so as to produce a generally Z-shaped folded configuration. Automatically-actuated stop fingers limit lateral float of the support elements when the boom folds. For lodged crop, the spray nozzles on the support elements may be replaced by rotary wheel elements having projecting spoke elements which penetrate the crop and themselves carry spray nozzles to distribute spray from within the crop. A power driven air discharge nozzle may be provided to assist dispersal of the spray.

19 Claims, 8 Drawing Sheets

METHOD AND APPARATUS FOR CROP SPRAYING

TECHNICAL FIELD

This invention relates to a method and apparatus for crop spraying.

BACKGROUND OF THE INVENTION

In the growing of agricultural and horticultural crops, treatment of same by spraying, for example to protect the crop against pests and diseases, is now an important part of the crop growing program.

However, conventional field spraying equipment is subject to significant shortcomings due to the fact that the spray only reaches the portion of the foliage directly in the path of the spray. Thus, where a crop has dense foliage, as in the case of a potato crop, the applied spray does not reach the lower leaves beneath the top leaf cover. As potato crops are highly susceptible to fungal attack, this inability to properly spray the crop is of considerable significance.

There is disclosed in U.S. Pat. No. 1,348,038 to Neumeyer a sprayer for plants in which spaced downwardly extending pipes 16 are fixed to a transverse pipe 14 and deliver liquid to nozzles which are usually directed upwardly to deliver spray onto vines from below and upwardly. There is a similar disclosure in CH 229,146 (Leuenberger). Both these prior specifications show the use of fixed droplegs or the like for spraying between crop rows in a generally upwardly-directed direction, and are subject to the shortcoming that, in use, the droplegs vary in their proximity to the crop rows and in the case of established crops may cause significant damage.

In FR 2,563,970 (Balligand) there is disclosed a shredding/spraying implement in which individual units are biased laterally outwards in one particular direction against the crop rows in order to follow their irregular profile by actual contact with the crop stalks. Such a proposal is unacceptable for a machine intended to minimize crop contact and damage.

SUMMARY OF THE INVENTION

An object of the present invention is to provide a method and apparatus for spraying offering improvements in relation to one or more of the matters discussed herein, or generally.

According to the invention there is provided a method and apparatus for spraying as claimed in the accompanying claims.

In a preferred embodiment, a spraying device is provided which provides full spray cover for the crop being sprayed. A spray boom of the apparatus is more rigid than previously proposed booms. Attached to the boom are a number of support elements or drop legs disposed so as to correspond to, for example, the ridges which a potato crop is grown on. The support elements are trailed from the spraying boom. Each support element takes the form of a hinged arm which is attached to the boom at one end and is allowed to rest on the bottom of the valley between the potato ridges. The support elements serve to mount spraying devices which, in use, coat the under-side of the potato crop. Each support element may have a separator which allows the support element to pass through the potato foliage without causing damage. The trailing support element, or arm, is in contact with the uneven surface of the soil. This causes vibration of the support element. The vibration assists the leaf separator in its row-opening function. In the preferred embodiment, spraying can be effected even in windy conditions, as the micro-environment provided by the potato leaf cover reduces the wind drifting effect on the spray. In the event of too much movement of the support elements being caused in use, a damping device may be provided. Each support element may have more than one spray jet to produce greater spray cover.

The boom supporting the support elements may be arranged to fold, with the support elements thereon, to enable a relatively narrow transport width of the apparatus to be provided for use on public highways. The apparatus may well be usable in applications other than in relation to potato crops.

In the embodiments, means are included to assist the centralising of the support elements with respect to the crop rows. This arises from difficulties in forming potato ridges with exactly correctly positioned row centres. Considerable variations can occur in this respect, depending on tractor driver ability, prevailing soil conditions, and field gradients. To meet the problems caused by wandering of the crop rows in a lateral direction, embodiments have free floating self-aligning support elements, or arms, which center themselves with respect to the bottom of the valley between successive potato ridges. In one embodiment, instead of the support elements being pivotally mounted directly to the boom, they are mounted on a carriage which can move laterally with respect to the boom to produce the self-alignment function. The boom has one or more rails on which the carriage is mounted for rolling movement. The support elements and the carriages may be interconnected so that the support elements achieve lateral movement in unison or with a variable degree of independence.

In a further preferred embodiment, attention is given to the problems of providing a sufficiently narrow transport width for the apparatus, having regard to the need to transport the apparatus to and from its place of work, via public highways. There is also a need for the folding of the boom to be able to be effected by the tractor driver form his in-cab working position, without descending from the cab.

In this preferred embodiment, the boom has a generally triangular cross-sectional shape to provide additional stiffness. Previously proposed boom constructions would have inadequate stiffness and would twist in use.

A further factor in relation to this aspect of the invention concerns the need to avoid interaction of the support elements, or arms, in the transport position of the apparatus. In this preferred embodiment, a boom span of 12 meters can be folded within the rear profile of a tractor. Moreover, the support elements, attached to the lower side of the generally triangular cross-sectional shape do not interlock, as between those on one section of the boom, and those on a neighbouring section. The support elements are freely suspended from the boom and fold flat against it when it is raised for transport. The boom is formed with multiple sections which can be readily folded. The nearest section of the boom to the sub-frame which mounts on the hitch links of the agricultural tractor, is hinged so that when it is in its transport position, it lies over the rear of the sub-frame, along with the other attached sections. All sections can be folded independently of one another, enabling differing boom widths to be achieved. Construction of the boom and sub-frame may be of steel or alum injure or suitable alloy, and may be formed as a space frame or monocoque construction. A section through the boom may be triangular, or it may be found convenient to construct a section with more or less faces which are straight or curved. Safety break-away hinging may be provided either in each section of the boom, or in the sub-frame. The boom may also be provided with spray jets of the kind for spraying downwards from the boom, for use on land, or in the air.

The boom may be provided with an air collector to deflect the air flow that occurs when the booms are being passed over a crop, to deflect air flow generally downwardly towards the crop. This assits in retaining the fine spray droplets within the foliage cover, so as to inhibit drift to other crops or neighbouring fields.

Figure 1:
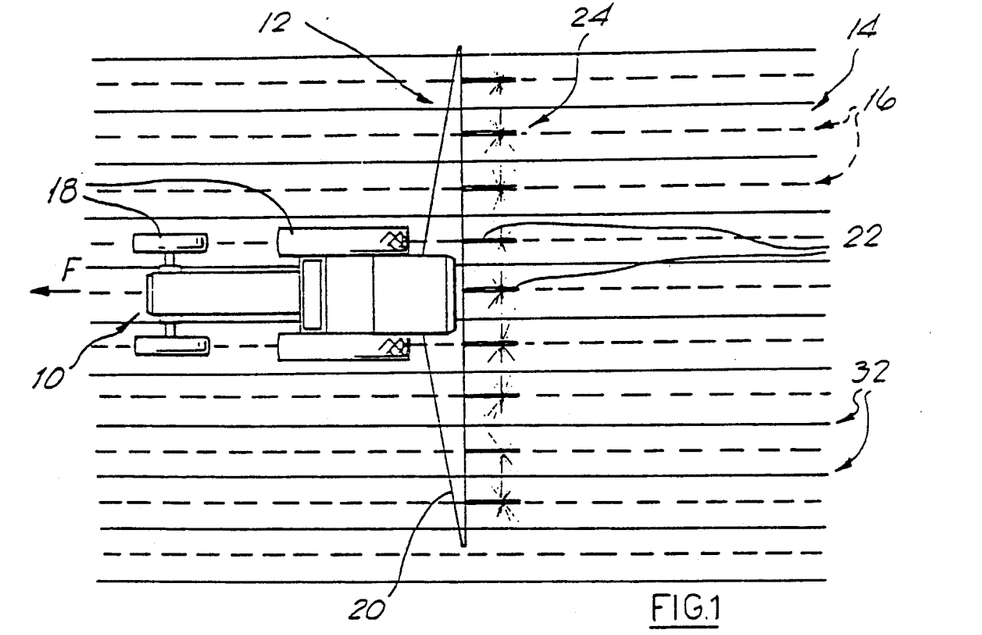

In a still further preferred embodiment, attention is given to the need to centralize the support elements, or arms, with respect to the rows, and to the need to provide sufficient response to crop density, and to avoid crop damage. An additional factor considered is problems arising from boom tilt on uneven ground. Such tilt leads to the distance between the tip of the support elements, or arms, and the soil surface varying to an extent which affects the performance of the spray means on the support arms. Also, there is a need to provide improved means for folding the support arms for transport.

In this preferred embodiment, a universal coupling has been provided between the support arms and the carriages which permit them to move laterally with respect to the boom. By the use of springs and adjustment chains, a multi-directional device is provided which can be adjusted to suit prevailing conditions. This feature also assists when folding the apparatus for transport, adjusting for crop density, and has added extra performance in allowing the support elements to move away from obstacles on the ground, or constituted by lodged crops. The support elements are thus able to weave in a lateral direction without affecting the spray performance, and damage to crops is reduced. In this embodiment, control of boom height and tilt has been achieved by providing sensors on the boom which are in contact with the soil surface. The sensors switch electrically operated actuators to level the boom so that the drop legs are positioned correctly in relation to the soil surface. A general height control facility is also incorporated in the system and is operated by utilising a parallel linkage between the sprayer main chassis and the boom. The linkage is actuated by an electrically driven actuator which can be controlled by either manual or automatic sensing. Provision is also made for the height control to be integrated with the tilt control thus making the adjustment of the boom automatic when spraying, thereby leaving the driver free to control the tractor.

In another preferred embodiment, a modification to the support elements, or arms, is provided. This is proposed for use in extreme cases where a crop has become completely lodged, or tangled. The support element is replaced by a rimless spoked wheel. The wheel has a convenient number of radial spokes which have a supply of sprayed liquid fed to them from the hub of the wheel. The fluid is distributed by a valve system to each of the spokes. At the ends of the spokes are attached a number of spray jets which are angled to spray the crop from the side. In order to avoid all the jets working all of the time, a hub valve system is provided so as to shut off the liquid when the spokes are out of the crop. In order that the spokes do not entangle the crop they are made adjustable so that the correct crop engagement angle may be achieved. This wheel spraying system and the support element or drop leg system are interchangeable. These and other features, objects and advantages, of the present invention are readily apparent from the following detailed description of the best mode for carrying out the invention when taken in connection with the accompanying drawings.

BRIEF DESCRIPTION OF THE DRAWINGS

Embodiments of the invention will now be described by way of example with reference to the accompanying drawings in which:

FIG. 1 shows a plan view of a tractor and sprayer, showing the support elements or spraying arms extending rearwardly from the boom of the sprayer;

FIG. 2 shows, diagrammatically, a support element, or spraying arm, in action, the view being from above;

FIG. 3 shows a side elevation view of a support element or spraying arm;

FIG. 4 shows a plan view of the support element or spraying arm of FIG. 3;

FIGS. 5 and 6 show a second embodiment, FIG. 5 showing a plan view and FIG. 6 an elevation view of a carriage assembly for mounting a modified support element or spray arm on the boom;

FIG. 7 shows, diagrammatically, the manner of folding the boom, this figure showing the boom in its half-folded position and attached to the tractor sprayer frame;

FIG. 8 shows the boom unit folded behind the rear of the tractor;

FIG. 9 shows a side elevation view of a modified spraying assembly in which a rotary wheel having radial sproke type spraying arms is employed to enter lodged crop;

FIG. 10 shows a plan view of the assembly of FIG. 9;

FIG. 11 shows a modification of the embodiment of FIG 3;

FIG. 12 shows a plan view of the support element assembly of FIG. 11;

FIG. 13 shows a plan view, similar to that of FIG. 5, showing a folding end portion of the boom, one exemplary carriage mounted thereon, and an actuatable finger mechanism for limiting lateral carriage movement when the boom folds;

FIG. 14 shows an end elevation view of the boom, similar to that of FIG. 6, with the support elements omitted, and the boom shown in a folded configuration;

FIG. 15 shows a rear elevation view of a folding end portion of the boom, shown partially folded; and FIG. 16 shows an end elevation view of the boom, similar to that of FIG. 14, and showing a support element location within an associated air duct.

As shown in FIGS. 1 and 2, a tractor 10 is drawing spraying apparatus 12 to spray a potato crop 14 in which there are valleys 16 between successive ridges in the earthed-up crop. The tractor runs with its wheels 18 in these valleys.

The spraying apparatus 12 comprises booms 20 extending laterally over the crop rows. The booms having trailing support elements 22 which extend downwards between the crop rows to the bottom of the valleys 16 so as to effect a spraying action as indicated at 24 in FIG. 1.

Figure 2:
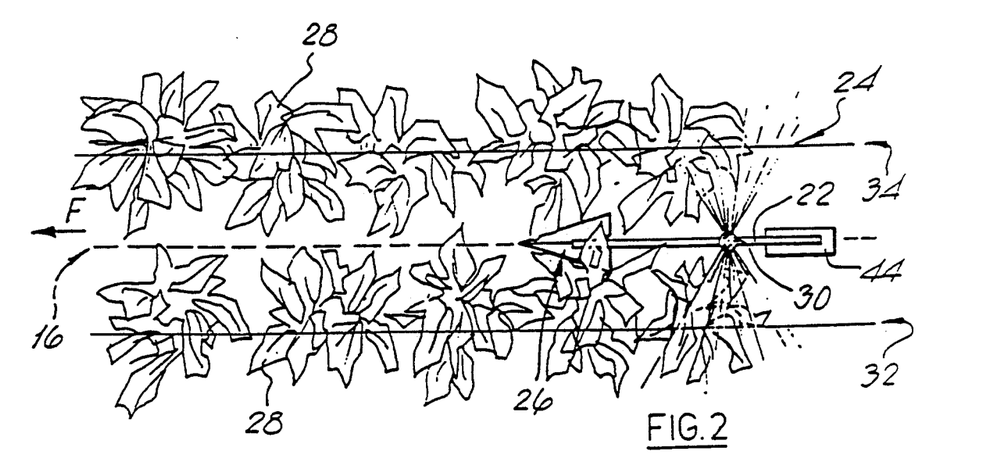

As shown in FIG. 2, a fowardly extending separator element 26 is provided in front of each of the support elements or arms 22 to divide a path through the leaves 28 of the potato crop, thereby enabling the trailing arm 22 to pass through the foliage without causing damage. The spray nozzle 30 which produces the spray 24 is positioned in the correct location on arm 22, to spray the undersides of the foliage 18 by means of a horizontally and/or vertically directed spray pattern as indicated at 24.

In FIGS. 1 and 2, the lines of the crop rows themselves (ie effectively the tops of the potato ridges, below which the potatoes themselves have been planted), are indicated by reference numeral 32, whereas the valleys between the ridges and a long which the row units of the sprayer pass (ie the support elements 22), together with the tractor wheels, are indicated at 16, as already mentioned.

Figure 3:
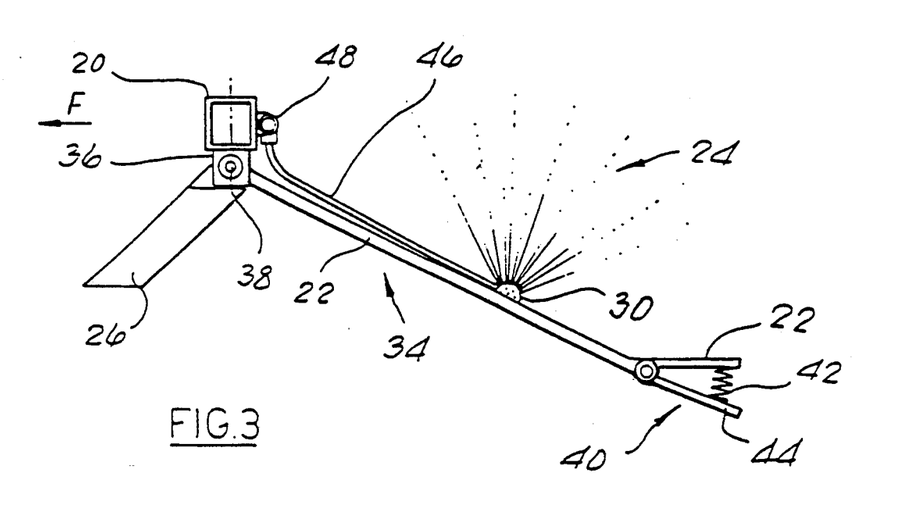
Figure 4:
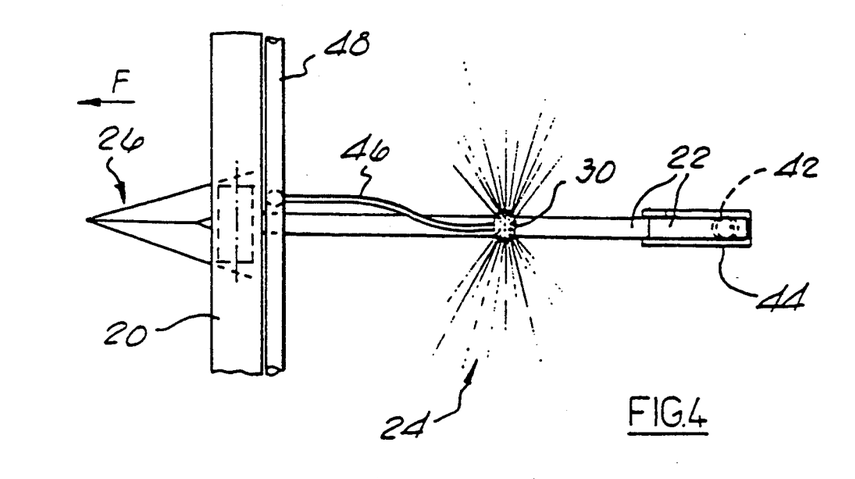

FIGS. 3 and 4 show further details of the row units 34, for each of the crop rows, each row unit comprising a support element or arm 22. For each row unit, there is provided below boom 20 a bracket 36. The support element or arm 22 is pivotally connected to the bracket. The leaf divider 26 is attached to arm 22. The pivot connection 38 on bracket 36 to arm 22 provides a degree of lost motion or float whereby the arm 22 is able to move laterally, to a certain extent, to accommodate lateral wandering of the crop rows.

A shock absorbing device 40 is provided at the trailing end of each arm 22 for engagement with the ground and comprises a spring 42 and a pivoted slider member 44. A flexible spray feed pipe 46 delivers spray liquid to the nozzle 30 and accommodates movement of the arm 22. Tube 46 is fed from a manifold 48.

In use, the support elements 22 extend downwardly between the crop rows 32 as the apparatus travels in direction F lengthwise of the rows. The nozzles 30 spray liquid upwardly and/or horizontally with respect to the ground so as to treat the crop material in the rows. The pivot 38 permits lateral movement of the support elements 22 with respect to their mounting to follow lateral row contours.

Figure 5:
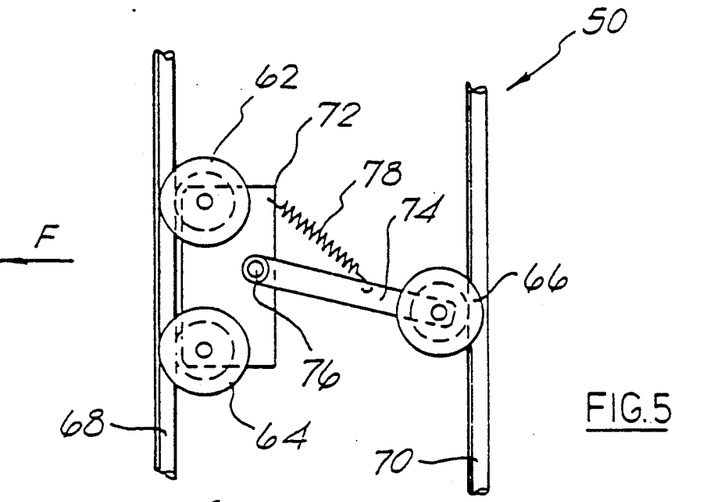
Figure 6:
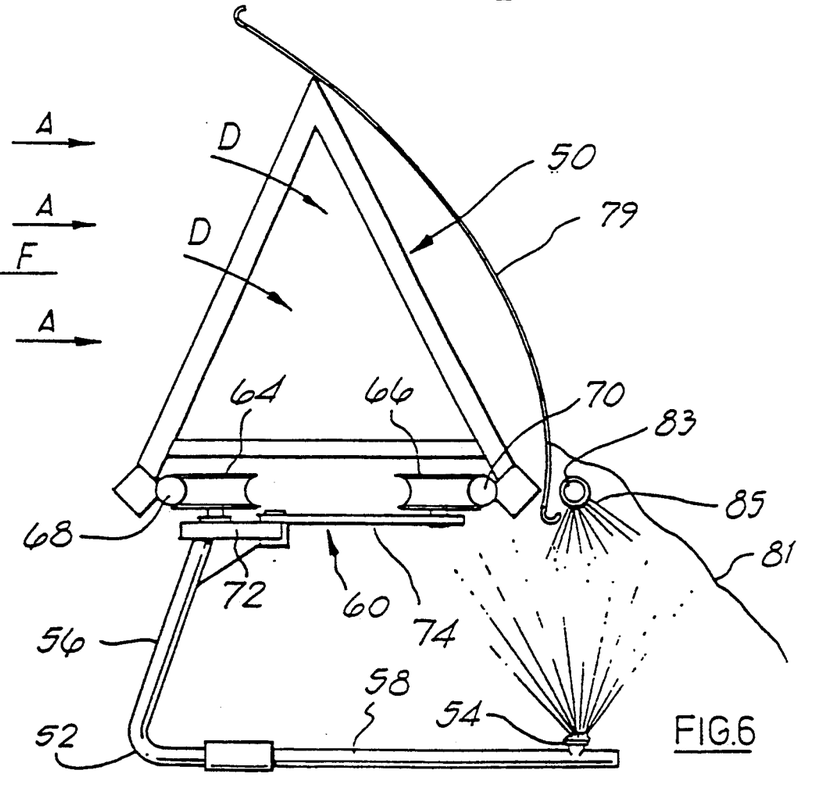

In the embodiment of FIGS. 5 and 6 there is provided refined and improved means for permitting lateral floating movement of the support elements or arms 22 with respect to their mountings and the boom, to follow lateral row contours.

In this embodiment, the boom 50 is shown having a generally triangular profile as seen in lengthwise cross-section. This provides the boom with the necessary stiffness and resistence to twisting forces.

In this embodiment, the support elements have a modified shape and profile and are indentified by reference numeral 52, with their nozzles 54 located in the region of their rear ends. Each support element has a downwardly and slightly forwardly extending portion 56 leading to a horizontal rearwardly extending portion 58. Portion 56 is connected to a carriage 60 having wheels 62, 64 and 66 engaging rails 68, 70 carried by the boom 50. The wheels roll on the rails with low friction, the rail and wheel profiles avoiding a pinching action.

Carriage 60 comprises a frame 72 on which a mounting arm 74 for wheel 66 is pivotally mounted at 76, and is biased by a spring 78 acting between the frame and the arm to hold all three carriage wheels 62, 64 and 66 in engagement with their rails. Frame 72 also serves to provide a mounting for the support element 52.

Thus, carriage 60 is freely laterally shiftable in both directions along rails 68, 70 to accommodate crop row contours. The apparatus otherwise functions as in the embodiment of FIGS. 1 to 4.

An aerofoilshaped air deflector 79 on boom 50 intercepts the air flow A due to travel in direction F and produces a downwardly directed flow D. A trailed flexible pvc canopy 81 serves to further confine the spray. FIG. 6 also shows at 83 a spray bar mounted on boom 50 and producing a downwardly directed spray 85 for simultaneous or sequential use with nozzles 54.

Figure 7:
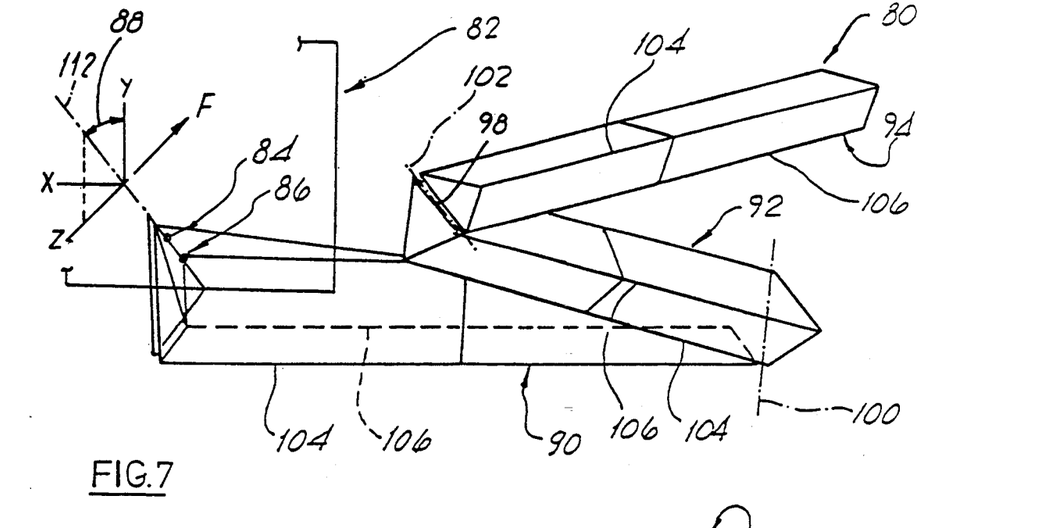
Figure 8:
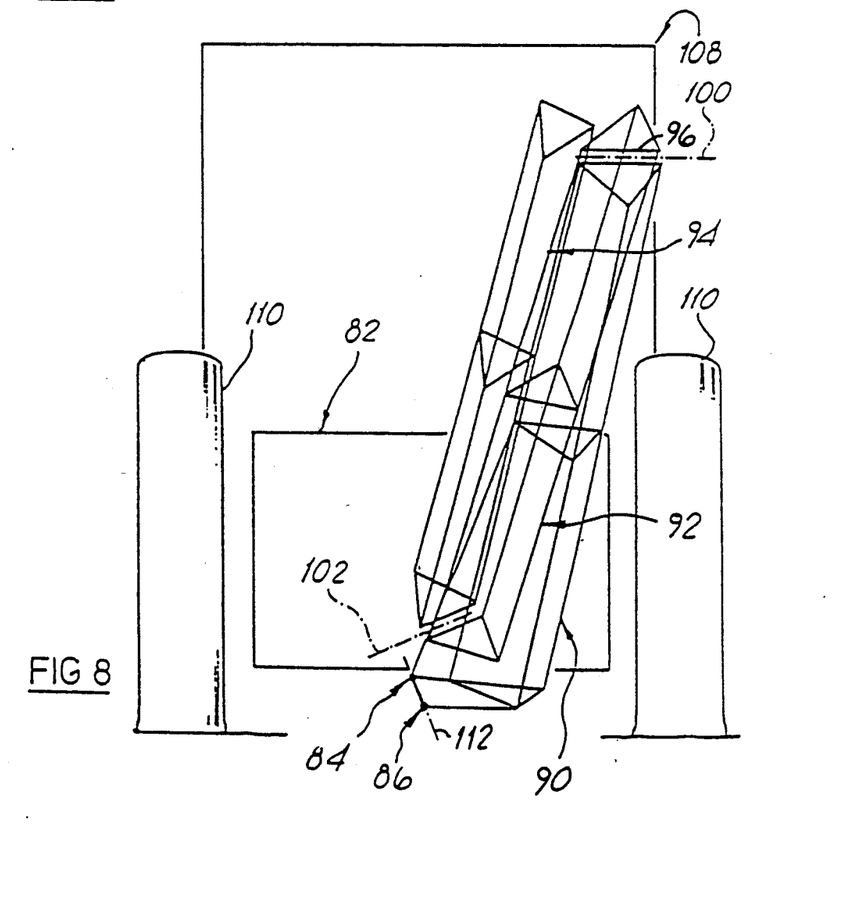

Turning now to the embodiment of FIGS. 7 and 8, FIG. 7 shows the boom 80 in a semi-folded state. A sub-frame 82 provides a mounting for boom 80 on the hitch links of the tractor (not shown). A corresponding boom is mounted on the other side of sub-frame 82. This latter is not illustrated, for reasons of simplicity of illustration.

Boom 80 is pivotally connected to sub-frame 82 at locations 84, 86. The disposition of the axes of the pivots is such that these are co-axial and inclined at the angle 88 with respect to sub-frame 82, so as to incline the boom towards the back of the tractor when folded. Thus, looking at FIG. 7 in particular, the back of the tractor lies in plane x-y and forward travel of the tractor is in the direction of arrow F which is coincident with axis z, i.e. perpendicular to the back of the tractor.

Boom 80 comprises boom portions 90, 92 and 94. The boom portions are pivotally interconnected by hinge assemblies having axes generally parallel to and close to the triangular edge profiles of the boom portions at 96 and 98, the hinge axes being identified by reference numerals 100 and 102.

As in the preceding embodiment, the support elements for the spraying row units are mounted on rails 104,106. These rails are shown, in FIG. 7, for each of the boom portions, and thus the location of the spraying devices in the semi-folded condition of the boom can be judged.

FIG. 8 shows the boom sections 90, 92 and 94 in fully folded transport configuration. It can be seen that the boom assembly is located well within the lateral confines of the tractor wheels 110.

It will be noted that in this embodiment the boom portions are pivotal about axes 100, 102, 112 which are not mutually parallel. These axes are however parallel to or approximately parallel to the sides of the triangular section boom structure, whereby the compact boom folded configuration is achieved. It will also be noted that the axis 112 about which the inner end of boom portion 90 pivots leans rearwardly at angle 88 as foredescribed as it extends upwards with respect to forward travel direction F.

Turning now to the embodiment of FIGS. 9 and 10, the boom 120 has mounted thereon carriages 122. Downwardly depending from each carriage is a support element 124, which is biased downwardly by a spring 126. In place of the nozzle or nozzles on each support element 124 there is provided a rotary wheel element 128. The wheel element has outwardly projecting spoke elements 130, each spoke element having spray means, to penetrate lodged crop 132, in a generally endwise manner. Liquid to be sprayed is delivered by a flexible conduit 134 to the hub 136 of wheel 128. The hub comprises valve means arranged to deliver the liquid only to those spoke elements 130 which have penetrated the crop 132, at any given instance.

Figure 9:
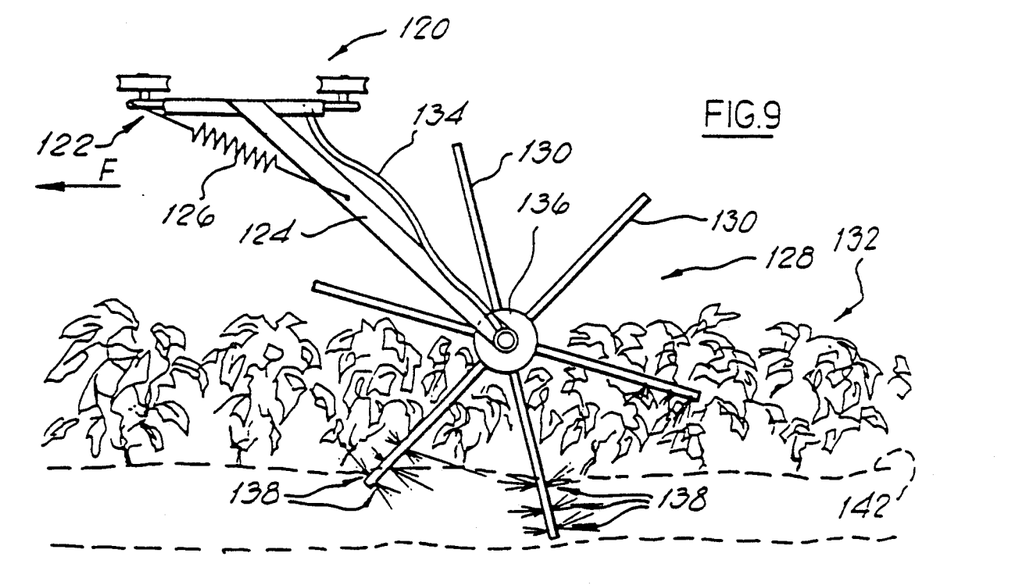
Figure 10:
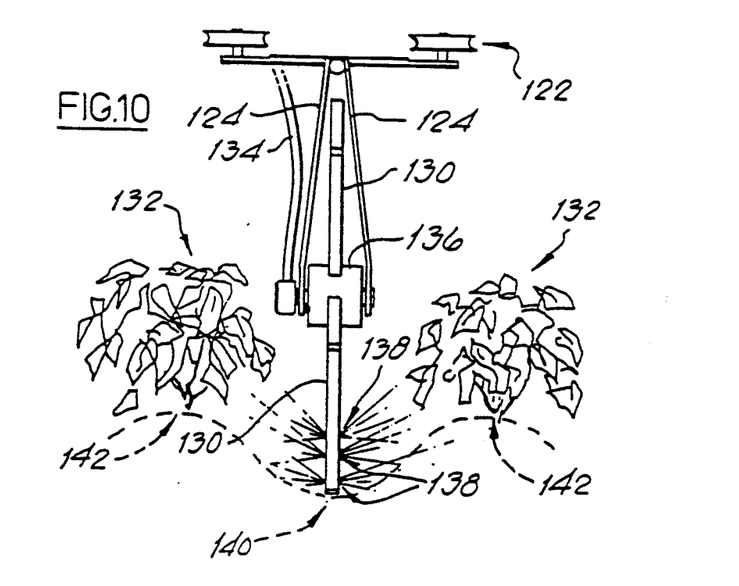

As shown in FIG. 9, the spoke elements 130 which are in the crop deliver a spray of the liquid in a generally horizontal and/or upwardly directed attitude so as to effect treatment of the crop, as in previous embodiments. The spoke elements deliver the spray from lengthwise-spaced outlets or nozzles provided on the spoke elements as indicated at 138.

In use, the spoke elements 130 penetrate the crop and, as the apparatus proceeds forwards in direction F, each of the wheels 128 is generally aligned with the valley 140 between two successive crop rows 142, and the spokes 130 are driven by the crop 132 and/or light engagement with the ground.

This embodiment is particularly well adapted to cope with dense and lodged crop which would otherwise represent (so far as prior art proposals are concerned) an impossible task so far as spraying the underside of the crop leaves is concerned, at a rate which would in any way compare with the rate of area coverage by conventional spraying machines which spray the crop from above (and thus leave the underside of the leaves untreated).

Figure 11:
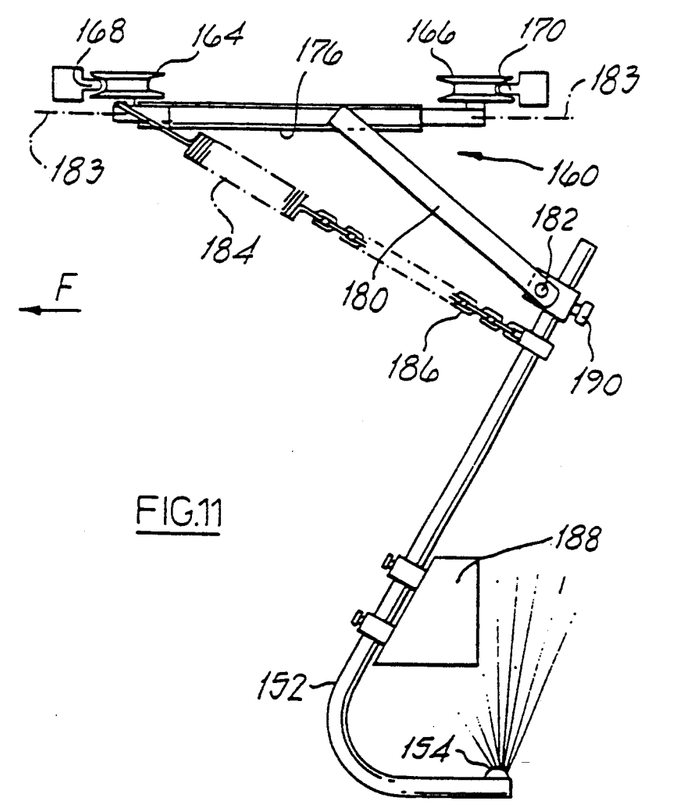
Figure 12:
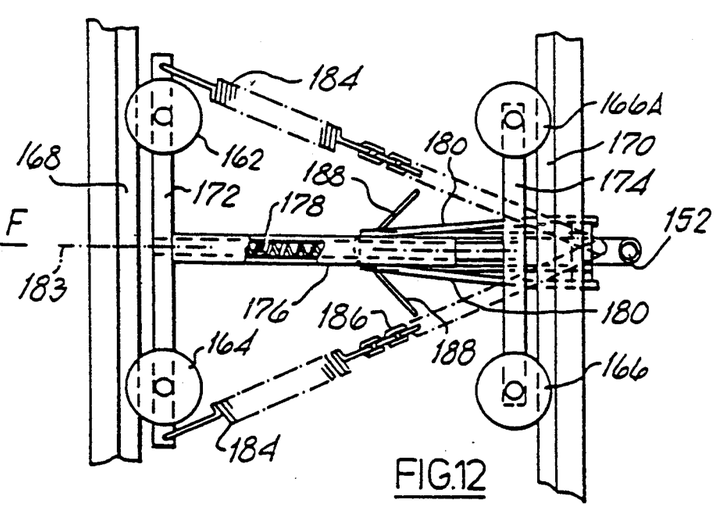

Turning now to the embodiment of FIGS. 11 and 12, it will be seen that this is a modification of the embodiment of FIGS. 5 and 6. Accordingly, parts corresponding to those of FIGS. 5 and 6 are given corresponding reference numerals increased by 100. Thus, rail 68 in FIGS. 5 and 6 becomes 168, and so on. In FIGS. 11 and 12, the boom 50 of FIGS. 5 and 6 has not been shown, for simplicity of illustration.

In this embodiment, the carriage structure 160 differs significantly from that of the embodiment of FIG. 5 and 6, and likewise the mounting and arrangement of the support element or arm 152.

So far as the carriage is concerned, it comprises two pairs of wheels 162, 164 and 166, 166A journalled on respective supports 172,174, and held in engagement with the rails by a telescopic plunger tube 176 having an internal compression spring 178.

The row unit arm or support element 152 (which supports the jet or nozzle 154) is mounted on carriage 160 by downwardly-depending arms 180 to which the support element is journalled at 182. Arms 180 can turn about the axes 183 of plunger tube 176. Element 152 is located against rearwardly directed dynamic forces arising during use by two coiled tension springs 184 and associated adjustment chains 186. The spring and chain assemblies have a line of action inclined with respect to the forward travel direction F, thereby having a centralising effect on the support element, while permitting lateral swinging of the support element under dynamic forces arising during use. Carriage 160 can, as in the previous embodiment, move bodily with respect to the boom to accommodate row contours. Chains 186 provide for adjustment of the normal working position of the support element as shown in FIG. 11. This will depend upon the crop density, and other working conditions. The springs provide safety overload characteristics.

Thus the support elements or drop legs 152 are completely floatingly mounted to follow row contours and respond to crop effects in a dynamic fashion during use. Moreover the elements 152 fold flat below the boom when the latter is raised for transport. This is permitted by pivotal movement about axes 183.

Laterally projecting inclined row guide probes or plates 188 are provided at each side of support element 152. These are position-adjustable for contact with the crop or crop ridges to exert a centralising effect on the row unit.

In operation, this embodiment has improved dynamic characteristics in terms of self-centralising action as the row units move lengthwise of the crop rows. Adjustment of the attitude of the support elements is provided and an adjuster 190 permits height adjustment of each support element itself with respect to its mounting.

Figures 13, 14:
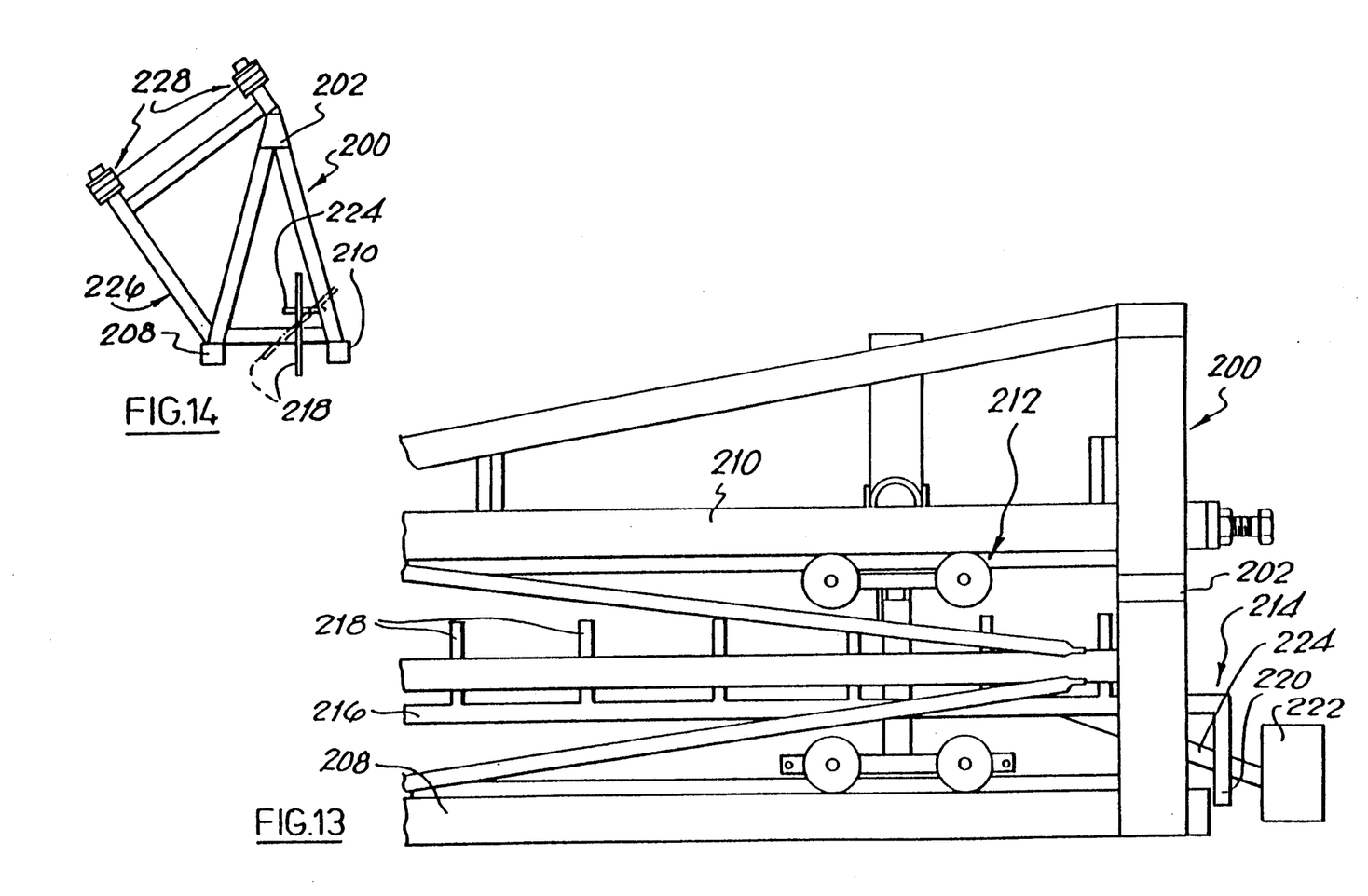
Figures 15, 16:
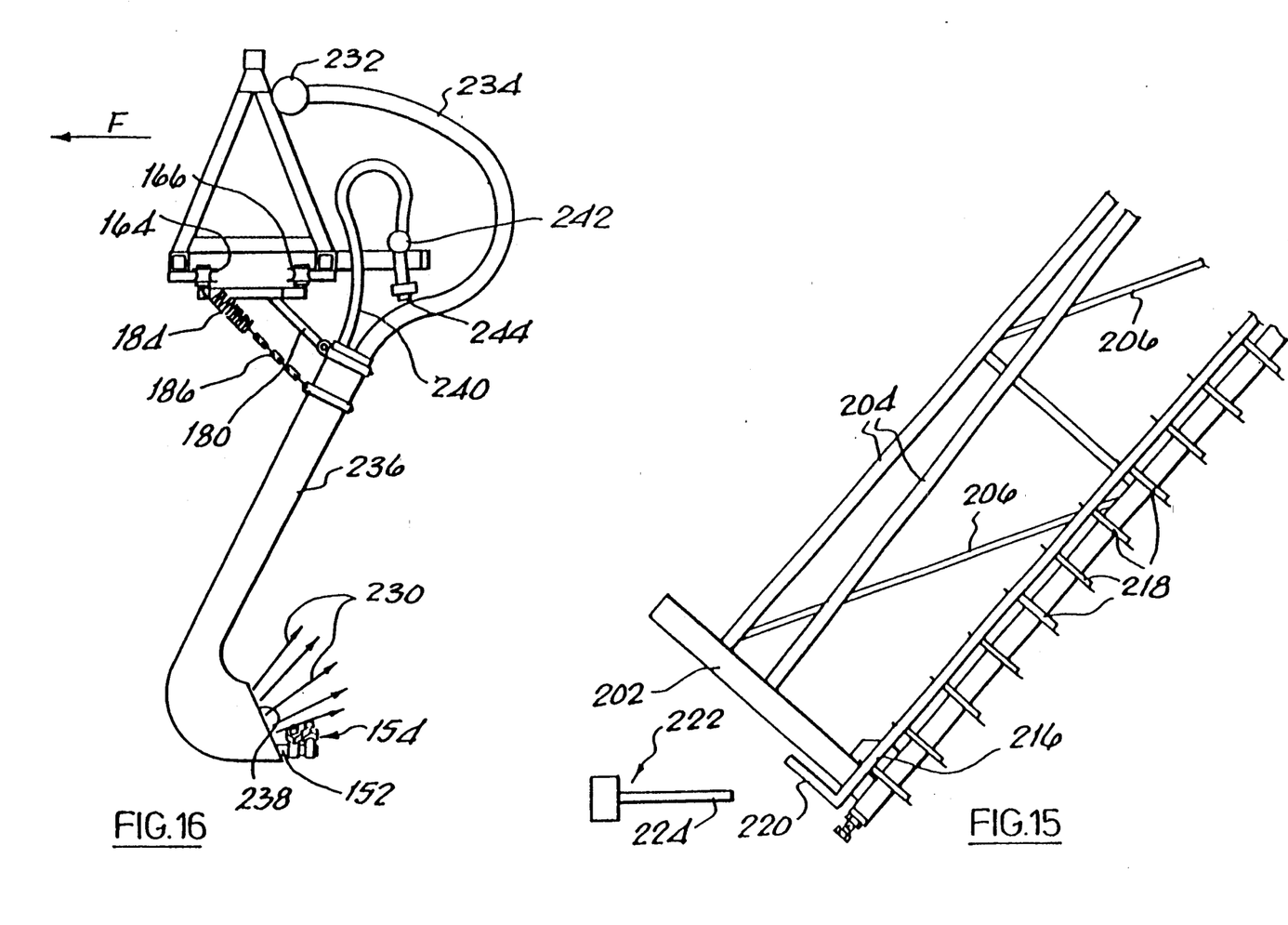

In the embodiment of FIGS. 13, 14 and 15, a folding boom portion 200 comprises a generally triangular end frame 202 with longitudinal ties 204 and inclined ties 206, together with spaced rails 208,210 on which carriage 212 is freely rollingly mounted.

In FIG. 13, only one carriage 212 is shown, but it is to be understood that one such carriage is provided for each row unit or support element of the apparatus.

In order to prevent lateral rolling movement of the carriages to one end of the boom, when the latter is raised for transport, means 214 is provided to limit or prevent such movement of the carriages and their associated support elements in the form of a bar 216 extending lengthwise of the boom, and having spaced finger elements 218 mounted thereon at intervals along its length to limit lateral movement of the carriages 212.

Bar 216 has an end portion 220 for actuating purposes, which cooperates with a fixed actuator means 222 having a projecting actuator element 224, and mounted on the adjacent non-folding boom portion, not shown in FIGS. 13 and 15.

Bar 216 is mounted on bearings (not shown) for angular movement about its lengthwise-extending axis so that the finger elements 218 move between the two positions indicated in FIG. 14, namely a generally vertical position in which carriage movement is limited to movement between two adjacent finger elements, and an inclined position in which the carriages can freely laterally float. Spring means, for example a coiled tension spring (not shown) biases the bar and the finger elements to the carriage-movement-limiting position.

In use, when the boom portion 200 is in its working position, in line with the adjacent boom portion, engagement of actuator element 224 with end portion 220 of bar 216 holds the finger elements 218 in their inclined position in which lateral carriage movement is permitted. When the boom portion is raised for transport purposes, the relative movement between the adjacent boom portions, as illustrated in FIG. 15, causes disengagement of the actuator element 224 from bar end portion 220 and the spring means causes the bar automatically to adopt its carriage-movement-limiting position.

In FIG. 14 there is indicated an adjacent boom portion 226 in an over-folded configuration and relationship with respect to boom portion 200, hinge means 228 being indicated, which permits such folding movement.

In the embodiment of FIG. 16, the general arrangement is as described above in relation to FIG. 11, with the following modifications. Parts corresponding to those described above and illustrated in FIG. 11 are given the same reference numerals as in that figure.

In this embodiment, means is provided to assist dispersal of spray from the swivel nozzles 154 at the rear end of the support element 152, by providing a flow of air indicated by arrows 230 so as to cause extra penetration, laterally and from below, of the adjacent crop foliage. The air stream 230 is provided by a compressor fan delivering through a manifold 232 having individual row ducts 234 leading, for each row, to a boot duct 236 having a suitably sized and profiled nozzle 238 at its lower end for producing the air stream 230.

Boot duct 236 houses support 152 also, and the liquid supply conduit 240 therefor which is connected to its associated manifold 242 which can also deliver to downwardly directed nozzles 244, for conventional spraying purposes.

In use, the air stream from nozzle 238 greatly assists dispersal and penetration of the crop by the spray from swivel nozzles 154.

While the best mode for carrying out the invention has been described in detail, those familiar with the art to which this invention relates will recognize various alternative designs and embodiments for practicing the invention as defined by the follow claims.

We claim:

1. A method of spraying in relation to row crops comprising:

a) providing downwardly extending support elements carrying spray means in the region of their lower ends;

b) positioning said support elements in relation to at least two crop rows so that the support elements extend downwardly between the crop rows;

c) moving said support elements lengthwise of said crop rows while said spray elements effect spraying;

d) selectively delivering a spray through said spray means in at least one direction generally upwardly and horizontally with respect to the ground so as to treat crop material in said crop rows;

e) using said support elements to sense the central region between said two crop rows; and f) providing means for permitting lateral floating movement of each of said support elements with respect to a mounting therefor and in both lateral directions, such that each of the support elements independently weaves along a central path between two adjacent crop rows during said movement lengthwise of said crop rows.

2. A method according to claim 1 characterized by said support elements being mounted for universal movement both in the fore and aft direction and laterally thereof.

3. A method according to claim 1 characterized by said support elements being mounted on a boom which is foldable for transport, and the method comprising the step of folding said boom for transport and pivoting said support elements to relatively unobtrusive transport positions.

4. A method according to claim 1 characterized by supporting said support elements on a boom, said boom being mounted for transport at generally a mid-point along the length of the boom, and folding said boom for transport by folding one portion of the boom inwards towards said mid-point, and folding another portion, which in-use is further outwards from sand mid-point than said one portion, outwards and away from said mid-point, and by pivoting the thus-folded boom inwards towards said mid-point.

5. A method of spraying in relation to row crops comprising:

a) providing downwardly extending support elements carrying spray means in the region of their lower ends;

b) positioning said support elements in relation to at least two crop rows so that the support elements extend downwardly between the crop rows;

c) moving said support elements lengthwise of said crop rows while said spray elements effect spraying;

d) selectively delivering a spray through said spray means in at least one direction generally upwardly and horizontally with respect to the ground so as to treat crop material in said crop rows;

e) using said support elements to sense the central region between said two crop rows;

f) permitting lateral floating movement of each of said support elements with respect to a mounting therefor and in both lateral directions so as to centralize the support elements between said rows; and said support elements being mounted on carriage means movable lengthwise of a boom, and said method comprising causing said carriage means to move in said both lateral directions so as to centralize the support elements between said rows.

6. A method according to claim 5 characterized by supporting said support elements on a boom and folding said boom for transport and/or storage, the method being further characterized by providing means to limit movement of at least some of said support elements of said boom lengthwise of said boom, on folding said boom, and causing same to thus-limit said movement.

7. A method according to claim 5 characterized in that said step of causing said means to limit said movement is effected automatically on folding said boom to its transport position.

8. A method of spraying in relation to row crops comprising:

a) providing downwardly extending support elements carrying spray means in the region of their lower ends;

b) positioning said support elements in relation to at least two crop rows so that the support elements extend downwardly between the crop rows;

c) moving said support elements lengthwise of said crop rows while said spray elements effect spraying;

d) selectively delivering a spray through said spray means in at least one direction generally upwardly and horizontally with respect to the ground so as to treat crop material in said crop rows;

e) using said support elements to sense the central region between said two crop rows;

f) permitting lateral floating movement of each of said support elements with respect to a mounting therefor and in both lateral directions so as to centralize the support elements between said rows;

said support elements being mounted on a pair of symmetric booms laterally extending in opposite directions from one another when in an unfolded condition, and being pivotally mounted for transport at a midpoint defined at the adjacent ends of said booms, each said boom including a plurality of folding portions; and supporting said boom elements on at least one of said booms and folding said boom for transport by folding the outermost portion of the boom inwards towards the mid-point along the length of the boom, and folding another portion, which in-use is further outwards from said mid-point than said one portion, outwards and away from said mid-point, and by pivoting the thus-folded boom inwards towards said mid-point.

9. Apparatus for spraying in relation to row crops comprising:
a) at least two support elements which, in use, extend downwardly and carry spray means in the region of their lower ends;
b) said support elements being adapted to be positioned in relation to at least two crop rows so that the support elements extend downwardly between the crop rows;
c) said apparatus being mobile for movement lengthwise of said crop rows while said spray means effect said spraying; and
d) said spray means being adapted to deliver spray, in use, in at least one direction generally upwardly and horizontally with respect to the ground, so as to treat crop material in said rows;
e) said support elements being mounted so as to sense the central region between said two crop rows; and
f) the mounting of said support elements including means for permitting floating lateral movement of each of said support elements with respect to said mounting thereof, in both lateral directions, such that each of the support elements independently weaves along a central path between two adjacent crop rows during said movement lengthwise of said crop rows.

10. Apparatus according to claim 9 characterized by said support elements being pivotally mounted on a boom which is foldable for transport, said pivotal mounting of said support elements permitting them to adopt unobtrusive transport positions on folding of said boom.

11. Apparatus according to claim 9 characterized by said support elements being mounted on a boom which is mounted for transport at which is foldable for transport by folding one portion of it inwards and towards said mid-point, folding another portion outwards, and said folded boom being then pivotable inwards towards said mid-point.

12. Apparatus according to claim 9 characterized by said support elements being mounted on a pivot assembly for universal movement both in the fore and aft direction and laterally thereof.

13. Apparatus for spraying in relation to row crops comprising:
a) at least two support elements which, in use, extend downwardly and carry spray means in the region of their lower ends;
b) said support elements being adapted to be positioned in relation to at least two crop rows so that the support elements extend downwardly between the crop rows;
c) said apparatus being mobile for movement lengthwise of said crop rows while said spray means effect said spraying;
d) said spray means being adapted to deliver spray, in use, in at least one direction generally upwardly and horizontally with respect to the ground, so as to treat crop material in said rows;
e) said support elements being mounted so as to sense the central region between said two crop rows;
f) the mounting of said support elements permitting floating lateral movement of each of said support elements with respect to said mounting thereof, in both lateral directions, so as to centralize the support elements between said rows; and
said support elements being mounted on carriage means movable lengthwise of a boom to enable said carriage means to move in said both lateral directions.

14. Apparatus according to claim 13 characterized by said support elements being mounted on a pivot assembly for universal movement both in the fore and aft direction and laterally thereof.

15. Apparatus according to claim 13 characterized by said support elements being supported on a boom, and said boom being foldable for both transport and storage purposes, and limit means being provided to limit movement of said support elements in the lengthwise direction of said boom on folding of said boom.

16. Apparatus according to claim 15 characterized by said limit means being arranged to come into effect automatically on folding said boom.

17. Apparatus for spraying in relation to row crops comprising:
a) at least two support elements which, in use, extend downwardly and carry spray means in the region of their lower ends;
b) said support elements being adapted to be positioned in relation to at least two crop rows so that the support elements extend downwardly between the crop rows;
c) said apparatus being mobile for movement lengthwise of said crop rows while said spray means effect said spraying;
d) said spray means being adapted to deliver spray, in use, in at least one direction generally upwardly and horizontally with respect to the ground, so as to treat crop material in said rows;
e) said support elements being mounted so as to sense the central region between said two crop rows;
f) the mounting of said support elements permitting floating lateral movement of each of said support elements with respect to said mounting thereof, in both lateral directions, so as to centralize the support elements between said rows; and
said support elements being mounted on a pair of symmetric booms laterally extending in opposite directions from one another when in an unfolded condition, and being pivotally mounted for transport at a midpoint defined at the adjacent ends of said booms, each said boom including a plurality of folding portions, each said boom being foldable for transport by folding one portion of it inwards and towards said mid-point along the length of the boom, folding another portion outwards, and said folded boom being then pivotable inwards towards said mid-point.

18. Apparatus according to claim 17 characterized in that said boom portions are pivotable about axes which are not mutually parallel.

19. Apparatus according to claim 18 characterized in that said axes are at least approximately parallel to respective triangular edge profiles the boom.

* * * * *